United States Patent
Pedersen

(10) Patent No.: US 9,775,365 B2
(45) Date of Patent: Oct. 3, 2017

(54) THAWING OF RAW MILK

(75) Inventor: Brian Pedersen, Skive (DK)

(73) Assignee: CALVEX A/S, Skive (DK)

(*) Notice: Subject to any disclaimer, the term of this patent is extended or adjusted under 35 U.S.C. 154(b) by 1475 days.

(21) Appl. No.: 13/130,678

(22) PCT Filed: Nov. 20, 2009

(86) PCT No.: PCT/DK2009/000243
§ 371 (c)(1),
(2), (4) Date: May 26, 2011

(87) PCT Pub. No.: WO2010/057497
PCT Pub. Date: May 27, 2010

(65) Prior Publication Data
US 2011/0229615 A1 Sep. 22, 2011

Related U.S. Application Data

(60) Provisional application No. 61/184,063, filed on Jun. 4, 2009.

(30) Foreign Application Priority Data

Nov. 21, 2008 (DK) .................................. 2008 01639

(51) Int. Cl.
*A23C 3/023* (2006.01)
*A23C 3/05* (2006.01)
(Continued)

(52) U.S. Cl.
CPC ............. *A23C 3/055* (2013.01); *A23C 3/023* (2013.01); *A23C 9/206* (2013.01); *A01J 11/00* (2013.01)

(58) Field of Classification Search
CPC ..... A01J 9/00; A01J 9/04; A01J 11/00; A23C 3/023; A23C 3/055; A23C 9/206
(Continued)

(56) References Cited

U.S. PATENT DOCUMENTS 3,744,402 A * 7/1973 Piegza ...................... A23L 3/14
134/153
4,018,911 A * 4/1977 Lionetti ................. A61K 35/18
424/533
(Continued)

FOREIGN PATENT DOCUMENTS

CA    1 038 808 A1    9/1978
CA    1038808         9/1978
(Continued)

OTHER PUBLICATIONS

International Search Report in corresponding international application No. PCT/DK2009/000243, mailed Mar. 31, 2010.
(Continued)

*Primary Examiner* — Reginald L Alexander
(74) *Attorney, Agent, or Firm* — Day Pitney LLP

(57) ABSTRACT

This invention relates to a flexible bag for storing raw milk where the flexible bag is for use in system comprising a cassette adapted to contain the flexible bag, where the flexible bag further comprises a spout, preferably with a screw top, and two or more perforations for fixing the flexible bag inside the cassette when the former is mounted in the cassette. Additionally, the invention relates to a cassette for use in a system comprising said cassette and the flexible bag, where the cassette comprises at least two sets of small pins, and at least two sets of cavities, where said cavities are adapted to receive said pins, and wherein said pins are constructed and placed such that they penetrate said perforations of said flexible bag, when said bag is placed inside said cassette. The invention also relates to a system comprising a cassette, a flexible bag and a heating tub adapted for holding a heating liquid, such as water, where the heating tub comprises a rack module for holding the
(Continued)

cassette such that it is at least partly covered with said heating liquid.

19 Claims, 7 Drawing Sheets

(51) Int. Cl.
 *A23C 9/20* (2006.01)
 *A01J 11/00* (2006.01)
(58) Field of Classification Search
 USPC ........... 99/451, 453, 483, 403, 407; 219/389
 See application file for complete search history.

(56) References Cited

U.S. PATENT DOCUMENTS

| | | | |
|---|---|---|---|
| 4,169,408 A * | 10/1979 | Mencacci | A23L 3/003 99/355 |
| 5,779,974 A | 7/1998 | Kuzyk | |
| 5,996,427 A * | 12/1999 | Masek | B01L 3/505 73/863.52 |
| 6,417,498 B1 * | 7/2002 | Shields | A47J 36/2427 219/386 |
| 6,417,698 B1 | 7/2002 | Williams et al. | |
| 7,104,074 B2 * | 9/2006 | Voute | A01N 1/00 280/79.3 |
| 2005/0103213 A1 * | 5/2005 | Dumm | A23C 3/031 99/483 |
| 2006/0280391 A1 * | 12/2006 | Buggs | B65D 33/2508 383/203 |
| 2007/0125098 A1 | 6/2007 | Voute et al. | |
| 2008/0093357 A1 | 4/2008 | Norman et al. | |
| 2008/0271730 A1 | 11/2008 | Takenaka | |
| 2010/0242744 A1 * | 9/2010 | Kastenschmidt | A23C 3/076 99/451 |

FOREIGN PATENT DOCUMENTS

| | | | | |
|---|---|---|---|---|
| GB | 2 432 829 A | 6/2007 | | |
| GB | 2432829 | 6/2007 | | |
| GB | WO 2008119991 A1 * | 10/2008 | | A23L 3/001 |
| JP | 2006333841 | 12/2006 | | |
| WO | 2008 119991 A1 | 10/2008 | | |
| WO | 2008119991 | 10/2009 | | |

OTHER PUBLICATIONS

International Preliminary Report on Patentability in corresponding international application No. PCT/DK2009/000243, completed Feb. 2, 2011.
Written Opinion of the International Searching Authority, in corresponding international application No. PCT/DK2009/000243, completed Feb. 2, 2011.

* cited by examiner

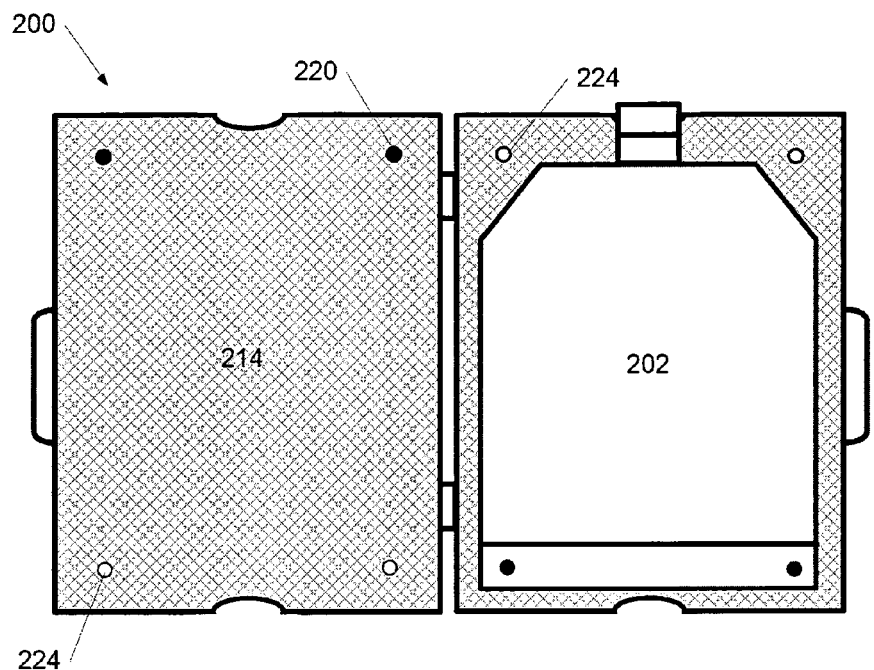
Fig. 2a
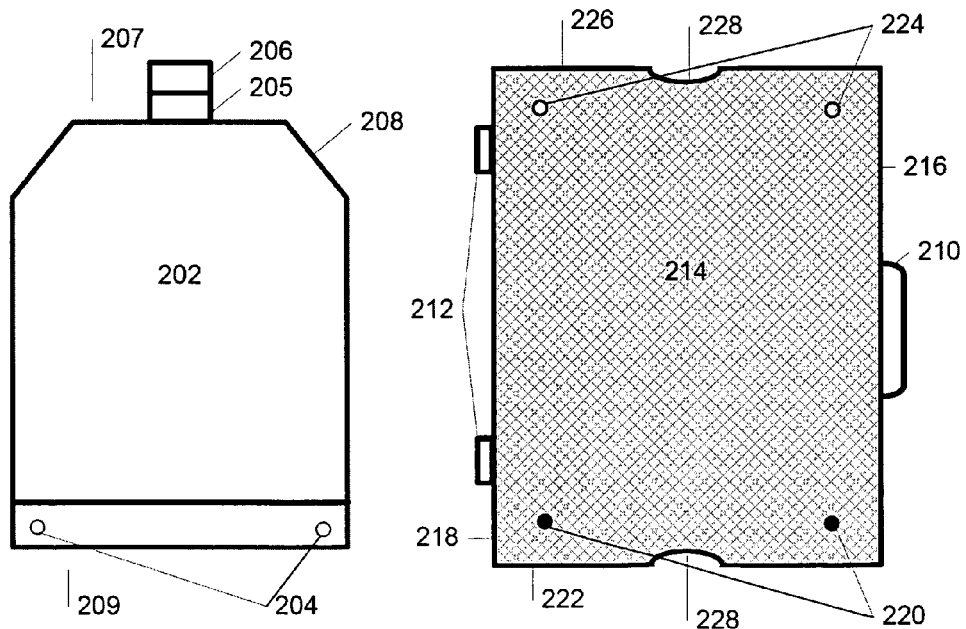
Fig. 2b  Fig. 2c

THAWING OF RAW MILK

This application is a U.S. National Stage of International Application No. PCT/DK2009/000243, filed on Nov. 20, 2009, and claims priority to U.S. Provisional Application No. 61/184,063, filed on Jun. 4, 2009 and to DK PA200801639, filed on Nov. 21, 2008, the contents of each are incorporated herein by reference in their entirety.

FIELD OF THE INVENTION

The present invention relates to improvements in or relating to the thawing and pasteurization of raw milk (colostrum milk) for calves.

BACKGROUND

Approximately every sixth calf (15%) in Denmark dies, most of them in the first month of their life, which is an economical challenge to numerous farmers and a cost in terms of job enjoyment for the agriculturalist and his employees. On top of that, this is an extensive image-related challenge for the livestock sector.

It is a fact that a great number of the surviving calves do not possess the quality (health, vitality and developmental potential) which they from birth have the potential to grow. This has been the case for several years in spite of repeated campaigns to improve the present circumstances and conditions to obtain a reduction in the mortality of the calves.

There is a general consensus amongst agriculturalists and counselors that these problems actually will be solved, if it is secured that the newborn calf receives raw milk (colostrum) in sufficient and adequate quantities and of a good quality early after the calving.

Tangibly this means that the suckling calf ought to receive four liters of raw milk with at least 50 grams immunoglobulin (antibodies) per liter before it is six hours old.

The heart of the matter is that the theory needs to be put in practice in such a way that it will work reliably and dependably 365 days a year and 24 hours a day, notwithstanding which member of the staff is on duty.

Regarding the aspect of raising calves on stored colostrum, it is a fact that colostrum milk is good feed for calves of any age, so there is a great advantage in storing excess colostrum for calf feeding. Refrigeration and freezing is the best method of storing colostrum, but is also the most expensive.

Every newborn calf needs colostrum. It is important as the first feed to condition the digestive tract and to give the calf resistance to diseases. Disease resistance is provided by the presence of immunoglobulins in the first milk of the dam and the ability of the calf to absorb these antibodies during the early hours of its life. This ability declines and disappears about 24 hours after birth. Consequently, the earlier the calf receives colostrum, the greater will be its benefit.

If milk from its dam is not available, colostrum from another cow freshening at the same time, or fresh, frozen colostrum stored for such an eventuality may be used. A blood transfusion from the dam and antibiotic treatments has also been used. However, the latter method will not provide the degree of success achieved as when colostrum is available, thus with this alternative method a higher mortality rate can be expected.

Regarding the sanitary conditions, filthy milking practices, unclean containers and unsanitary storage conditions can cause undesirable bacterial contamination and sick calves.

The problems relating to the thawing of the milk are mostly related to the process being very time-consuming. One way of thawing of the milk is by using a microwave oven. However, in doing so the antibodies of the milk may be destroyed, as an uneven distribution of the heat in the microwave oven will overheat the outer layers of the colostrum, while the core part of the colostrum remains frozen.

As an alternative way of thawing frozen liquids, U.S. Pat. No. 6,417,698 discloses an apparatus for thawing, warming up and/or mixing frozen liquids placed inside smaller containers such as e.g. baby bottles, syringe and test tubes. The thawing, warming up and/or mixing is obtained by placing the object with the frozen liquid in heated water and vibrating the object, e.g. the baby bottle. By this apparatus, the frozen liquid is warmed up in a gentler fashion compared to using a microwave oven. However, problems with an uneven distribution of heat might still occur, as the heating liquid is not mixed. Further, the apparatus necessitates a thorough cleaning of e.g. the baby bottles subsequent to use—the latter in order to avoid unsanitary storage conditions and thereby sick babies.

Also, U.S. Pat. No. 5,779,974 discloses an apparatus for thawing of frozen liquid, in this case specifically blood plasma units, wherein these units are placed in a fluid bath with e.g. water. In this apparatus, the thawing process is combined with a kneading of the units by manipulation of the fluid. The kneading of the blood plasma units is a relatively tough handling process, and will not be suitable for thawing raw milk. Further, the frozen liquid needs to be stored in a flexible container in order for the kneading to have any effect.

OBJECT AND SUMMARY OF THE INVENTION

The present invention relates to a flexible bag for use in a storage system for handling raw milk, said storage system comprising said flexible bag and a cassette adapted to contain said flexible bag, wherein said flexible bag comprises fixation means adapted to interact with corresponding fixation means inside said cassette, whereby said flexible bag when contained inside said cassette is fixed. The fixation means ensures that the flexible bag does not move around inside the cassette, but instead stays in position independently of which way the cassette is turned. This is especially advantageous, because hereby is obtained an enhanced preservation of the bag inside the cassette ensuring that the bag does not move or roll up inside the cassette thereby not allowing e.g. a heating liquid to be in contact with the entire surface volume of the flexible bag if positioned inside a heating tub. By placing the bag inside the cassette, the dimensions of the bag with the raw milk are further reserved throughout the subsequent handling procedure including e.g. freezing, thawing, heating and/or pasteurization of the raw milk.

In an embodiment, said fixation means of said flexible bag includes two or more perforations in said flexible bag adapted to interact with corresponding protrusions in said cassette, thereby ensuring an effective fixation of said bag.

Said flexible bag can further comprise a spout, preferably with a screw top, which is advantageous as it facilitates an easy filling and emptying of the flexible bag, when turned with the spout pointing downwards.

The flexible bag may also have at least two oblique edges facilitating an easy emptying of said flexible bag when it is turned upside down, as the bag thereby takes the form of a funnel. This is advantageous, as it minimizes the chances of valuable milk getting stuck inside the bag.

The invention also relates to a flexible bag in a flexible material which can withstand freezing, thawing, and pasteurization. This obviates the need to use different containers for e.g. thawing and pasteurizing the milk, which in turn minimizes the exposure of the raw milk to bacteria once the bag has been filled with raw milk. The flexible material can be plastic.

The flexible bag is in some embodiments of the invention dimensioned for containing approximately 4-6 liters of raw milk, which is the essential amount of milk that a calf needs within the first six hours of its life.

The invention further relates to a cassette for use in a storage system for handling raw milk, said storage system comprising a flexible bag and said cassette adapted to contain said flexible bag, wherein said cassette comprises fixation means adapted to interact with corresponding fixation means on said flexible bag, whereby said flexible bag when contained inside said cassette is fixed. Hereby is ensured an effective fixation of the flexible bag inside the cassette. This also ensures that the flexible bags do not get stuck together in the freezer if in a stable situation, as they are protected by the cassette.

In some embodiments said fixation means includes two or more protrusions adapted to interact with corresponding perforations in said cassette. This ensures an effective fixation of the flexible bag inside said cassette.

In some embodiments, said cassette has a surface with inside channels, enabling a maximum area of contact between said colostrum bag inside the cassette and a liquid, such as water, when said cassette is placed inside a tub with said liquid. This is highly advantageous, as a maximum area of contact between the liquid in the tub and the flexible bag with raw milk positioned inside the cassette is obtained. The channels also provide a maximum movement of the liquid surrounding the bag, which provides 1) a constant replacement of the liquid, which is in direct contact with flexible bag, 2) a high temperature stability of the liquid in the tub, which is highly advantageous when e.g. pasteurizing raw milk, and 3) reduces the thawing time of frozen raw milk.

The cassette may further comprise one or more recesses for fixing said spout of said flexible bag in said cassette, when said flexible bag is placed inside said cassette. This ensures an additional fixation of the bag inside the cassette.

The cassette may further comprise a handle, which allows for an easy handling and transportation of the cassette.

The invention also relates to a cassette, wherein said cassette is constructed of two identical halves, where one is turned upside down in relation to the other one, and where said identical halves comprise at least two hinges for connecting said halves. Using two identical halves for creating the cassette is advantageous production costs wise, as only one model is needed for producing both sides of the cassette. The cassette can be in molded plastic, in metal or similar materials.

The invention further relates to a system for storing raw milk comprising a flexible bag for containing said raw milk and a cassette for containing said flexible bag.

The object of the present invention is also to improve the process of thawing and pasteurizing raw milk (colostrum milk) for calves.

The present invention therefore also relates to a system for heating raw milk comprising a container for storing said raw milk and a heating tub, where said heating tub is adapted for holding a heating liquid, such as water, and said container such that it is at least partly covered with said heating liquid when positioned in said heating tub, and wherein said heating tub further comprises a rack module for holding said container and means for rotating said rack module and thereby said container placed in said rack module.

Hereby is obtained that raw milk is pasteurized and/or frozen raw milk is thawed by a gentle and fast process in this system which also has a higher possibility of preserving the antibodies in the milk. Further, the rotation of the rack module creates movement in the heating liquid, thereby ensuring an acceleration of the heating process. Also, the storage capacity of the milk in the container is an advantage because hereby the handling of the milk is enhanced.

The invention also relates to a system, wherein said rack module is adapted for holding more than one container, whereby multiple containers with raw milk can be thawed or pasteurized simultaneously.

The invention further relates to a system, wherein said means for rotating said rack module rotates said rack module around an axis aligned through the center of said rack module, such that said container(s) can be rotated 360 degrees around said central axis. Maximum flow of the liquid inside the tub is hereby obtained, ensuring a constant temperature of liquid and a faster heating of the raw milk. Said axis can be aligned with the horizontal plan.

Said heating tub may further comprise an outlet at the bottom of said heating tub, such that said liquid can be replaced as required and needed. This is advantageous when e.g. cleaning the tub.

The invention further relates to a system, wherein said heating tub comprises means for changing the temperature of heating liquid in said heating tub. This is an advantage because the milk may be required to be thawed, pasteurized and subsequently fed to the calf within a certain temperature range. The means for changing the temperature of said heating liquid in said heating tub can be used for thawing of frozen raw milk or for pasteurizing raw milk. In embodiments of the invention, said means for changing the temperature of said heating liquid inside said heating tub is a heating element.

In some embodiments of the invention, said heating liquid covers said container(s) as said containers in said rack module are rotated around said axis. This ensures the fastest and most effective heating of the raw milk, as said container(s) are always covered with said heating liquid having a constant temperature.

In embodiments of the invention, the temperature of said heating liquid in said heating tub can be controlled down to a precision of at least ±0.5 degrees Celsius by means of said heating element and/or said rotation of said rack module with said container placed inside. This is highly advantageous as e.g. a pasteurization process is very sensitive to temperature changes.

Said means for changing the temperature of said heating liquid in said heating tub can be used for thawing of frozen raw milk or for pasteurizing raw milk.

The present invention also relates to a system wherein said container comprises a spout, preferably with a screw top. Hereby is obtained the possibility of sealing the container reliably.

The present invention also relates to a system, wherein said container comprises a flexible bag mounted in a cassette, wherein said flexible bag is adapted to be mounted in said cassette. Hereby is obtained a protection of the flexible bag by the cassette.

The cassette may have a surface with inside channels allowing said heating liquid to be in continuous contact with the surface of said flexible bag with said raw milk. This is highly advantageous, as a maximum area of contact between the liquid in the tub and the flexible bag with raw milk positioned inside the cassette is obtained. The channels also provide a maximum movement of the liquid surrounding the bag, which provides 1) a constant replacement of the liquid, which is in direct contact with flexible bag, 2) a high temperature stability of the liquid in the tub, which is highly advantageous when e.g. pasteurizing raw milk, and 3) reduces the thawing time of frozen raw milk.

The present invention also relates to a thawing tub to be used in a system for heating raw milk, said system comprising a container for storing said raw milk and said heating tub, where said heating tub is adapted for holding a heating liquid, such as water, and said container such that it is at least partly covered with said heating liquid when positioned in said heating tub, and wherein said heating tub further comprises a rack module for holding said container and means for rotating said rack module and thereby said container placed in said rack module.

Hereby is obtained that raw milk is pasteurized and/or frozen raw milk is thawed by a gentle and fast process in this system which also has a higher possibility of preserving the antibodies in the milk. Further, the rotation of the rack module creates movement in the heating liquid, thereby ensuring an acceleration of the heating process. Also, the storage capacity of the milk in the container is an advantage because hereby the handling of the milk is enhanced.

The invention also relates to a heating tub, wherein said rack module is adapted for holding more than one container, whereby multiple containers with raw milk can be thawed or pasteurized simultaneously.

The invention further relates to a heating tub, wherein said means for rotating said rack module rotates said rack module around an axis aligned through the center of said rack module, such that said container(s) can be rotated 360 degrees around said central axis. Maximum flow of the liquid inside the tub is hereby obtained, ensuring a constant temperature of liquid and a faster heating of the raw milk. Said axis can be aligned with the horizontal plan.

Said heating tub may further comprise an outlet at the bottom of said heating tub, such that said liquid can be replaced as required and needed. This is advantageous when e.g. cleaning the tub.

The invention further relates to a heating tub, which comprises means for changing the temperature of the heating liquid in said heating tub. This is an advantage because the milk may be required to be thawed, pasteurized and subsequently fed to the calf within a certain temperature range. The means for changing the temperature of said heating liquid in said heating tub can be used for thawing of frozen raw milk or for pasteurizing raw milk. In embodiments of the invention, said means for changing the temperature of said heating liquid inside said heating tub is a heating element.

In some embodiments of the invention, said heating liquid covers said container(s) as said containers in said rack module are rotated around said axis. This ensures the fastest and most effective heating of the raw milk, as said container(s) are always covered with said heating liquid having a constant temperature.

In embodiments of the invention, the temperature of said heating liquid in said heating tub can be controlled down to a precision of at least ±0.5 degrees Celsius by means of said heating element and/or said rotation of said rack module with said container placed inside. This is highly advantageous as e.g. a pasteurization process is very sensitive to temperature changes.

Said means for changing the temperature of said heating liquid in said heating tub can be used for thawing of frozen raw milk or for pasteurizing raw milk.

The present invention is also characterized in a method of heating raw milk comprising the actions of positioning a container with said raw milk in a rack module positioned inside a heating tub, at least partly covering said container with a heating liquid, heating said heating liquid by use of a heating element positioned inside said heating tub, and rotating said rack module relative to said heating tub thereby heating said raw milk in said container.

By this method the process of heating raw milk is considerably enhanced compared to the method of using a microwave oven for heating the milk. The mortality of the calves may be reduced considerably by the use of this new method. The calves in the herd will be healthier and stronger, and this will subsequently result in production animals (beef cattle and dairy cows), where the animals' genetic potential can be improved considerably. In other terms, increased milk yields higher growth and diminished medical consumption 15 which all in all affects the agriculturalist in a positive manner.

Furthermore, the factors of having less difficulty with sick and ailing animals as well as an elevated level of job enjoyment of the agriculturalists and staff members should not be underestimated.

The invention also relates to a method, wherein heating said heating liquid and rotating of said rack module occur simultaneously.

The heating element may heat up said heating liquid to a temperature of between 40-50 degrees Celsius, thereby enabling thawing of frozen raw milk, or alternatively the heating element heats up said heating liquid to a temperature of 60 degrees Celsius, thereby enabling pasteurization of raw milk.

BRIEF DESCRIPTION OF THE DRAWINGS

In the following, preferred embodiments of the invention will be described referring to the figures, where;

FIG. 2a illustrates a side view of a two-part colostrum container comprising a flexible bag (shown in detail in FIG. 2b) and a cassette shown in an open form. One half of the cassette is shown in detail in FIG. 2c FIGS. 3a-c illustrate the assembly of an embodiment of the two-part container of FIGS. 2a-c.

DESCRIPTION OF EMBODIMENTS

Figure 1A:
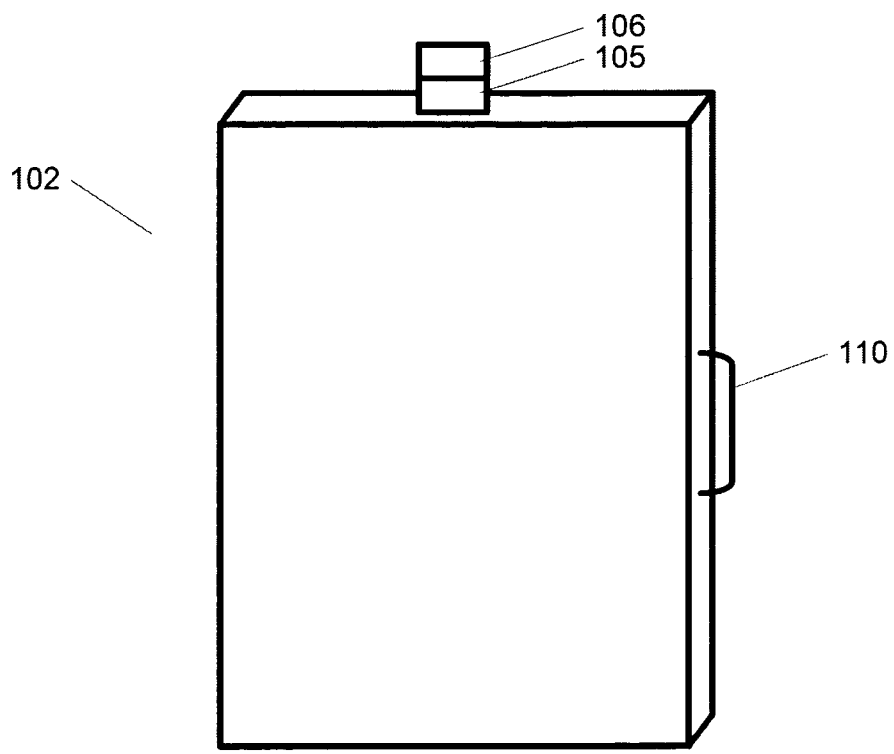
FIGS. 1a and b illustrate a side view of a colostrum container.

In FIGS. 1a and b are illustrated two different embodiments of a container 102, 104 for storing raw milk according to the invention. The containers 102, 104, which are also referred to as colostrum containers comprise a connector spout 105 possibly with a screw top 106 at the upper end of the colostrum container 102, 104. The containers 102, 104 normally have a handle 110, for easy handling and transport.

Furthermore, the container 104 has oblique edges 108 which facilitate the emptying of the colostrum container 104 when turned upside down. Hereby the risk of valuable milk getting stuck in the corners of the container 104 is avoided as the container 104 takes the form of a funnel in its upside down position.

The raw milk containers 102, 104 may be manufactured in a plastic material which can withstand freezing, thawing, heating (at 40-50 degrees Celsius), and pasteurization (at 60 degrees Celsius).

The containers 102, 104 can normally contain around 4-6 liters of raw milk, which is the essential amount of milk that the calf needs within the first six hours after it is born. They are further dimensioned such that the surface area is as large as possible in order to facilitate a fast thawing of the milk, at the same time as keeping the containers 102, 104 at a dimension, which allows for an easy handling.

In a storage situation the connector spout 105 can be linked with the screw top 106. In a feeding situation, the connector spout 105 can be linked with the end of a tube or hose with a stomach tube or a suction device for delivering the milk to the calf.

FIG. 2a illustrates another embodiment of a container 200 for storing raw milk according to the invention, wherein the container 200 is in a two part form, with a flexible bag 202 (shown in detail in FIG. 2b) for storing the raw milk and a cassette 214 (one half shown in detail in FIG. 2c) for securing the bag 202. The container 200 is shown in an open position illustrating the positioning of the bag 202 inside the cassette 214.

Figure 1B:
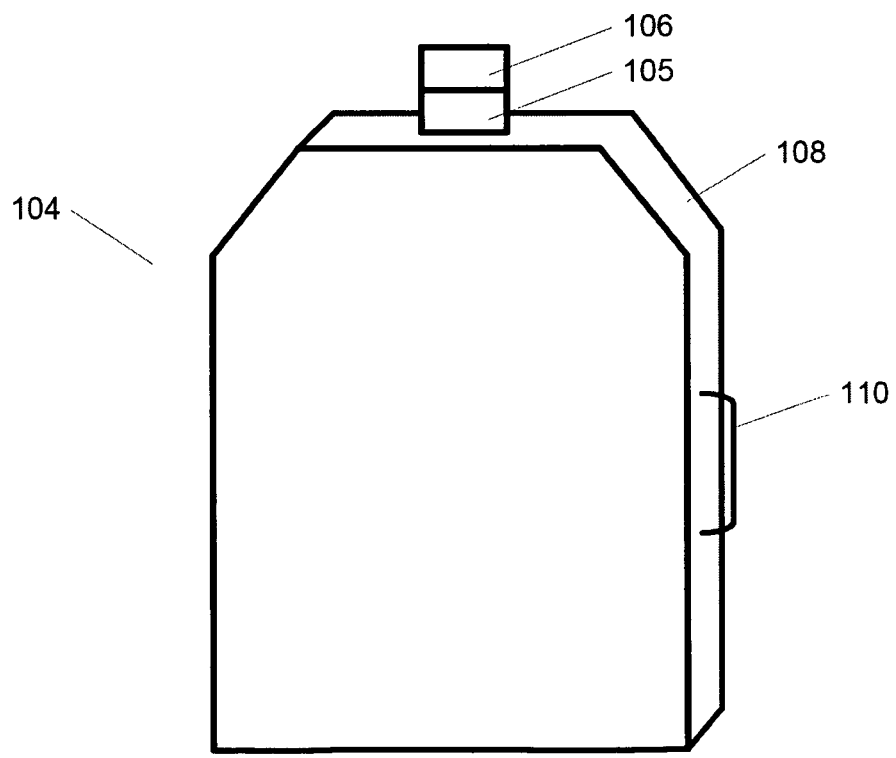

Like the colostrum containers 102, 104 of FIGS. 1a and 1b, the bag 202 disclosed in FIGS. 2a and b comprises a connector spout 205 optionally with a screw top 206 at the upper end 207. Furthermore, the bag 202 has oblique edges 208 which facilitate the emptying of the bag 202 when it is turned upside down. Hereby the risk of valuable milk getting stuck in the corners of the bag 202 is avoided as it takes the form of a funnel in its upside down position.

The bag 202 also has at least two installation perforations 204 at the lower end 209. The bag 202 can be fastened in the cassette 214 by the connector spout 205 (possibly equipped with a screw top 206) in the upper end 207 of the bag 202 and by the two perforations 204 in the lower end 209 of the bag 202.

Because of the high demands on hygiene, the bag 202 is preferably a disposable article and of a flexible material which makes it easier to work with.

The bag 202 may be manufactured in a plastic material which can withstand freezing, thawing, heating (at 40-50 degrees Celsius), and pasteurization (at 60 degrees Celsius), and is normally dimensioned such that it can contain around 4-6 liters of raw milk, which is the essential amount of milk that the calf needs within the first six hours after it is born. The bag 202 (and thereby also the cassette 214) is further dimensioned such that the surface area is as large as possible in order to facilitate a fast thawing of the milk, at the same time as keeping it at a dimension which allows for an easy handling.

In a storage situation the connector spout 205 can be linked with the screw top 206. In a feeding situation, the connector spout 205 can be linked with the end of a tube or hose with a stomach tube or a suction device for delivering the milk to the calf.

The cassette 214 displayed in FIG. 2a is constructed from two identical halves, where one is turned upside down in relation to the other one. In FIG. 2c is found an illustration of the one of the identical halves of the colostrum cassette 214. The cassette 214 comprises a handle 210 at one side 216 and two hinges 212 at the second side 218, wherein the hinges 212 are used to connect the two halves. The cassette 214 further comprises at least two small pins 220 at a third side 222 and matching receiving cavities 224 at the fourth side 226. The pins 220 are constructed and placed such that they penetrate the bag's perforations 204, when the bag 202 is placed inside the cassette 214.

The cassette halves additionally contain two recesses 228 placed opposite of one another on the third 222 and fourth side 226. These recesses 228 are for fixing the positioning of the bag's connector spout 205 (possibly with the screw top 206) at one of the ends. In the assembly situation when the cassette 214 containing the bag 202 is closed, the pins 220 penetrate the bag's perforations 204 before they are secured in the cavities 224 and the positioning of the connector spout 205 fixates the bag 202 between the two halves of the cassette 214. It is hereby avoided that the bag 202 moves around after insertion inside the cassette 214. As the cassette 214 is constructed from two identical halves turned upside down in relation to one another, there are recesses 228 and a set of pins 220 and matching cavities 224 at each end of the assemble cassette 214. Thus, it does not matter if the bag 202 is placed with the connector spout 205 pointing upwards or downwards.

An object of the cassette 214 is to protect the raw milk in the bag 202 and to simplify the handling of the colostrum bag 202 in each and every working operation. The handle 210 of the cassette 214 makes it effortless to manage the cassette 214 and the bag 202 inside the cassette 214.

The surface of the cassette 214 is preferably manufactured with openings and channels enabling a maximum area of contact between the tempered liquid, such as water, and the colostrum bag 202 inside the cassette 214. Maximum movement of the liquid surrounding the bag 202 is thereby facilitated. This provides 1) a constant replacement of the liquid, which is in direct contact with bag 202, 2) a temperature stability of the liquid in the heating tub of down to ±0.5 degrees Celsius, which is highly advantageous when e.g. pasteurizing raw milk, and 3) reduces the thawing time of frozen raw milk.

Furthermore, the cassette 214 has the necessary stability and installation of the colostrum bag 202 in the cassette 214 is simple.

The cassette 214 controls the colostrum bag 202 by the two halves of the cassette 214 which clamp the connector spout 205 in the upper opening end 207 of the bag 202 and by two pins in the opposite end of the cassette 214 which grasp into two perforations 204 in the opposite end 209 of the colostrum bag 202. Furthermore, the edge of the two cassette 214 halves has a rough surface, which clutches the colostrum bag 202.

The cassette 214 consists of two symmetric parts in molded plastic and is assembled at two hinges 212. However, it may also be constructed in metal or other materials.

When the bag 202 is fixed, the cassette 214 is furthermore secured by up to six plastic clips.

The cassette 214 can be used and recycled numerous times.

Figure 3A:
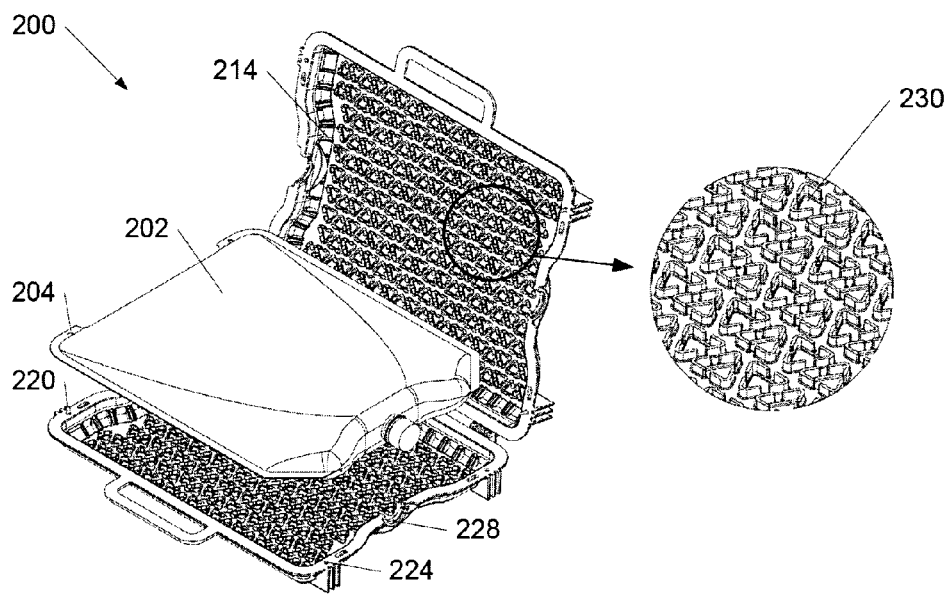
Figure 3B:
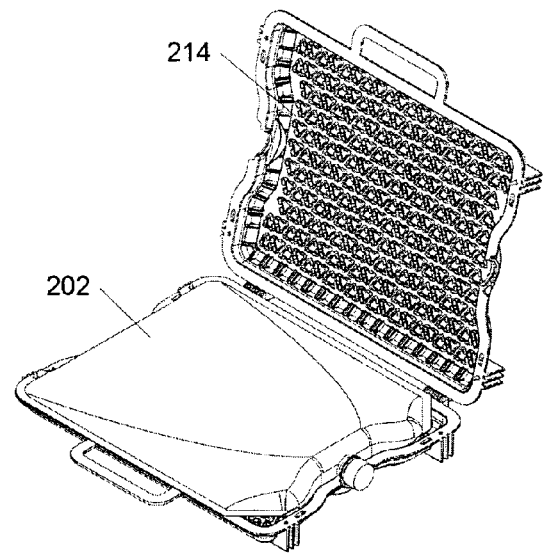
Figure 3C:
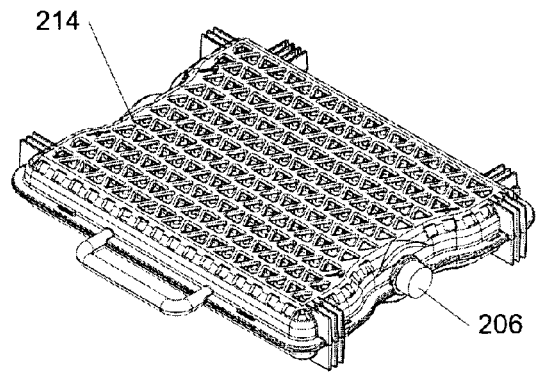

FIGS. 3a-c illustrate how to assemble an embodiment of the two-part container 200 of FIGS. 2a-c, with FIG. 3a showing the flexible bag 202 in the process of inserting it into the cassette 214, FIG. 3b showing the bag 202 fully inserted in the cassette 214 and FIG. 3c showing the closed cassette 214 with the flexible bag 202 inside. The enhanced view of the cassette 214 shown in FIG. 3a shows one possible embodiment of the openings and channels 330 in the cassette 214, here taking a triangular form. When using the two-part container 200 of FIGS. 2a-c and 3a-c, the cassette 214 ensures that the bags 200 do not get stuck in the freezer, as they would without the cassette 214, again ensuring a better protection of the bags.

Before the milk is stored in the refrigerator or freezer, a registration of the colostrum's quality, date of milking, the number of the cow, etc. is marked on a number of plates, which are clicked on the container 102, 104, 200.

The milk may also be pasteurized before it is stored in the freezer. This is done by warming up the milk to 60 degrees Celsius in the heating tub (see description in FIGS. 5a-c) and keeping it at 60 degrees Celsius for about 1 hour, where after the temperature is lowered to 38 degrees Celsius.

From the time the raw milk is poured into the container 102, 104, 200 and until it is fed to the calf, it is not subjected to external sources of bacteria, as it is contained inside the same container 102, 104, 200. This ensures a high level of hygiene, which reduces the risk of the calf getting sick.

Filling and drainage of the raw milk into the containers 102, 104 of FIGS. 1a and 1b or the two-part container 200 of FIGS. 2a-c and 3a-c take place at the end of the container and not at the side of it, which ensures a simplified filling or bottling and a complete emptying of the colostrum containers.

Figure 4:
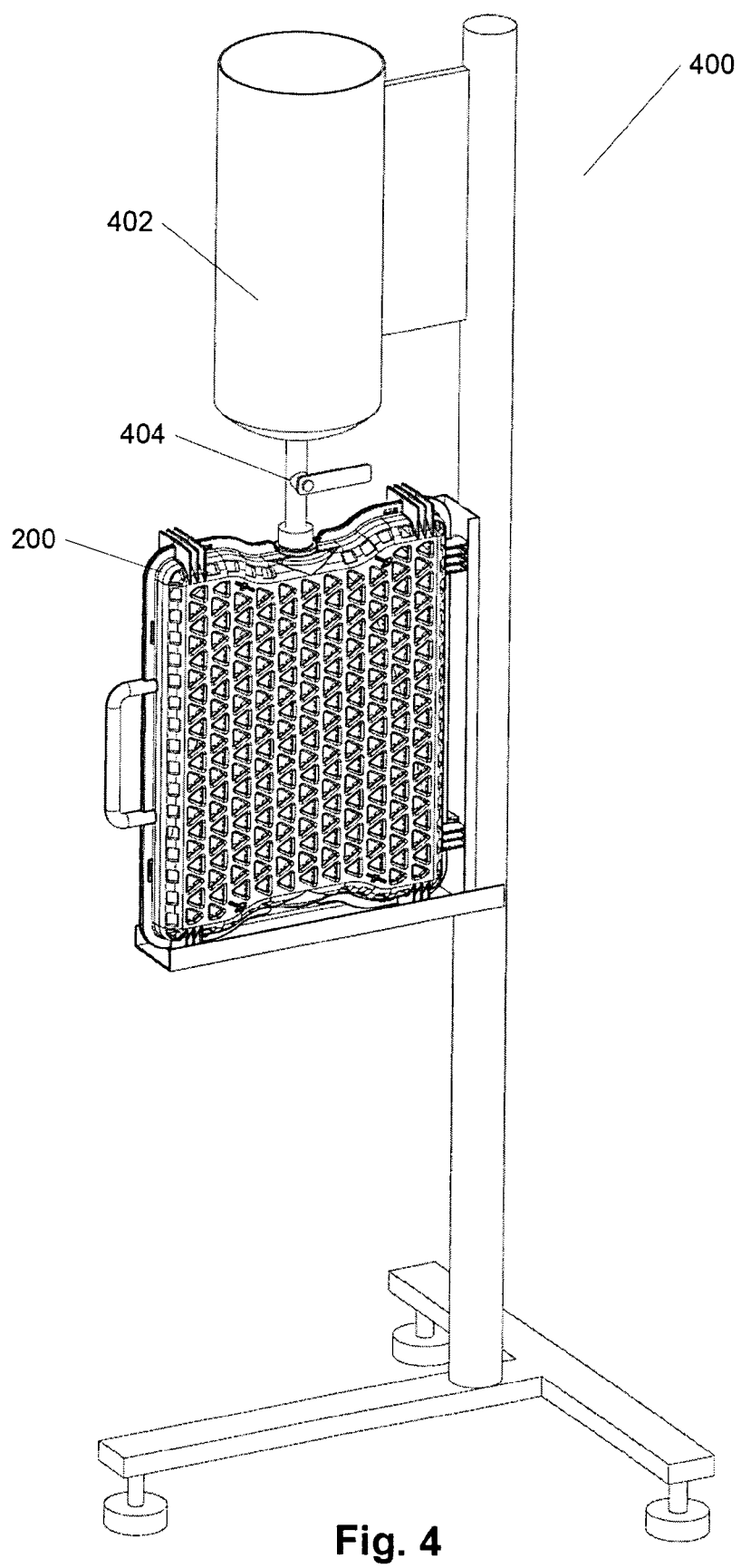
FIG. 4 illustrates the filling of the colostrum container.

Filling of the raw milk into the container 102, 104, 200 is enabled by a filling holder 400 as illustrated in FIG. 4, with the filling of the two-part container 200. The filling holder 400 can stand by itself on a plane surface. The work flow process regarding the measurement of the quality of the raw milk is simplified and improved by using the filling holder 400, a work flow process which today is often skipped because it is rather inconvenient.

The raw milk container 102, 104, 200 is placed in the filling holder 400. On top of the filling holder, there is a funnel 402 with an overflow pipe at four liters and with an opening and closing spigot 404 at the bottom. The desired amount of milk (normally four liters) is poured down the funnel 402, which is closed. Thereupon the raw milk's content of immunoglobulins is measured by means of a colostrum meter.

If the quality is inadequate, the funnel 402 is turned to the side, and the spigot 404 below the funnel is opened and the milk is discarded. If the quality of the milk is acceptable, the opening of the funnel 402 is placed above the pipe connection to the raw milk container 102, 104, 200.

The opening of the funnel 402 is lowered down in the pipe connection. The spigot 404 for the funnel 402 is opened such that the raw milk streams down in the raw milk container 102, 104, 200.

After the filling of the raw milk container 102, 104, 200, the connector spout 105, 205 may be directly connected to a hose to feed the calves with the fresh raw milk. Alternatively, the screw top 106, 206 is on connector spout 105, 205 thereby closing the raw milk container 102, 104, 200, which can subsequently be put in the freezer for a later thawing in the heating tub (see description in FIGS. 5a-c) and subsequent feeding of the raw milk to the calf.

Figure 5A:
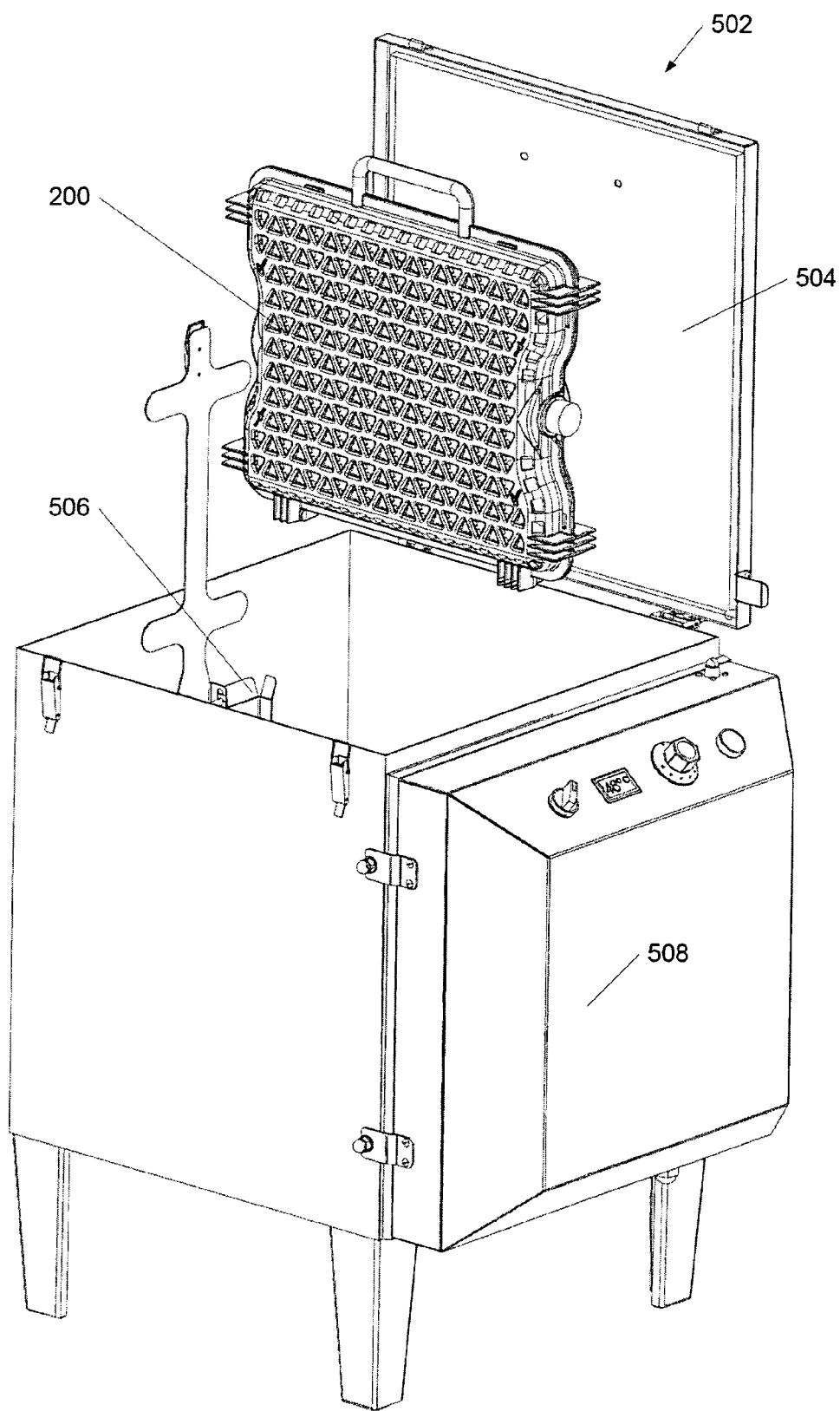
FIGS. 5a-c illustrate three different three-dimensional perspective views of the heating tub with one colostrum container placed inside the heating tub.
Figure 5B:
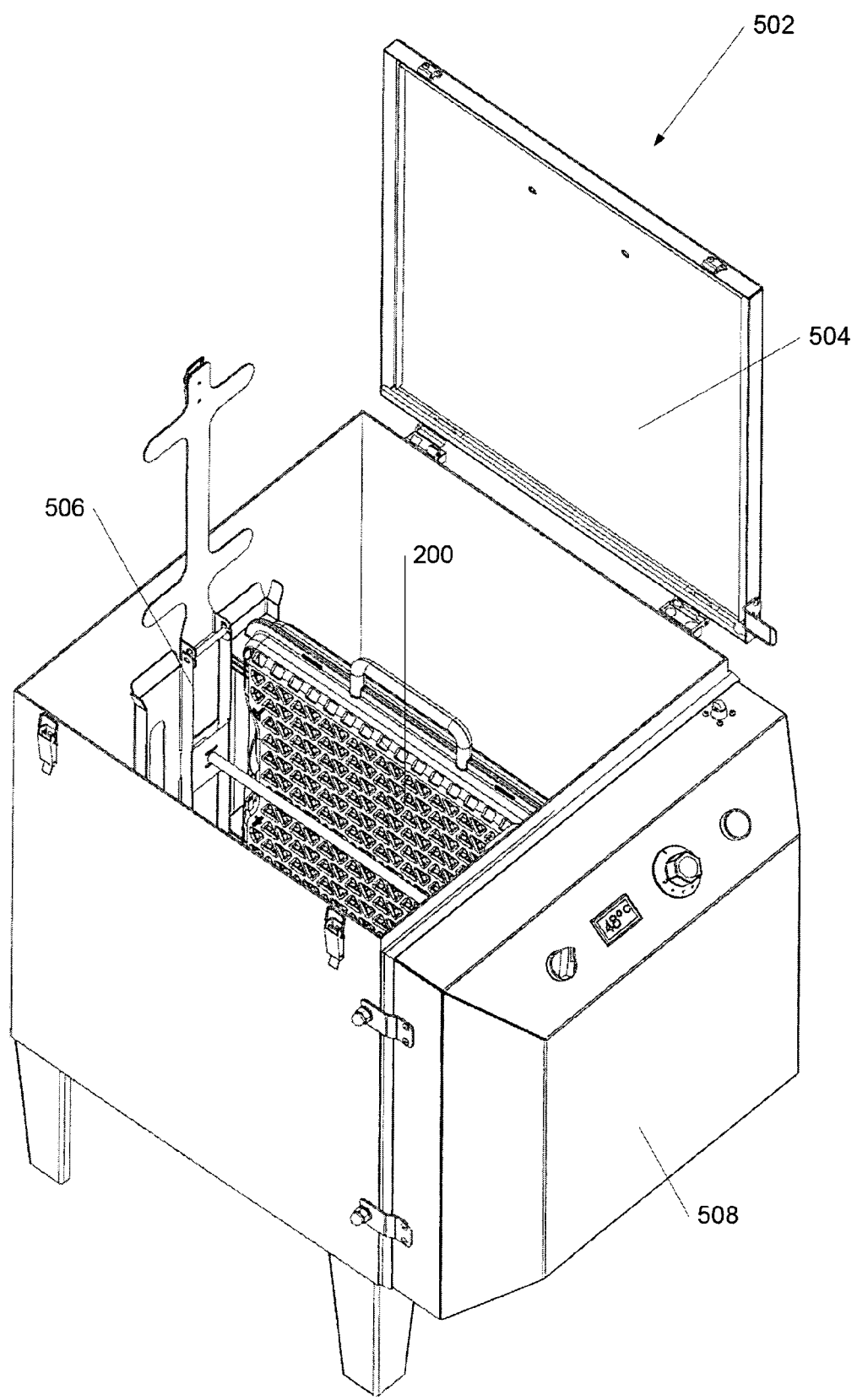
Figure 5C:
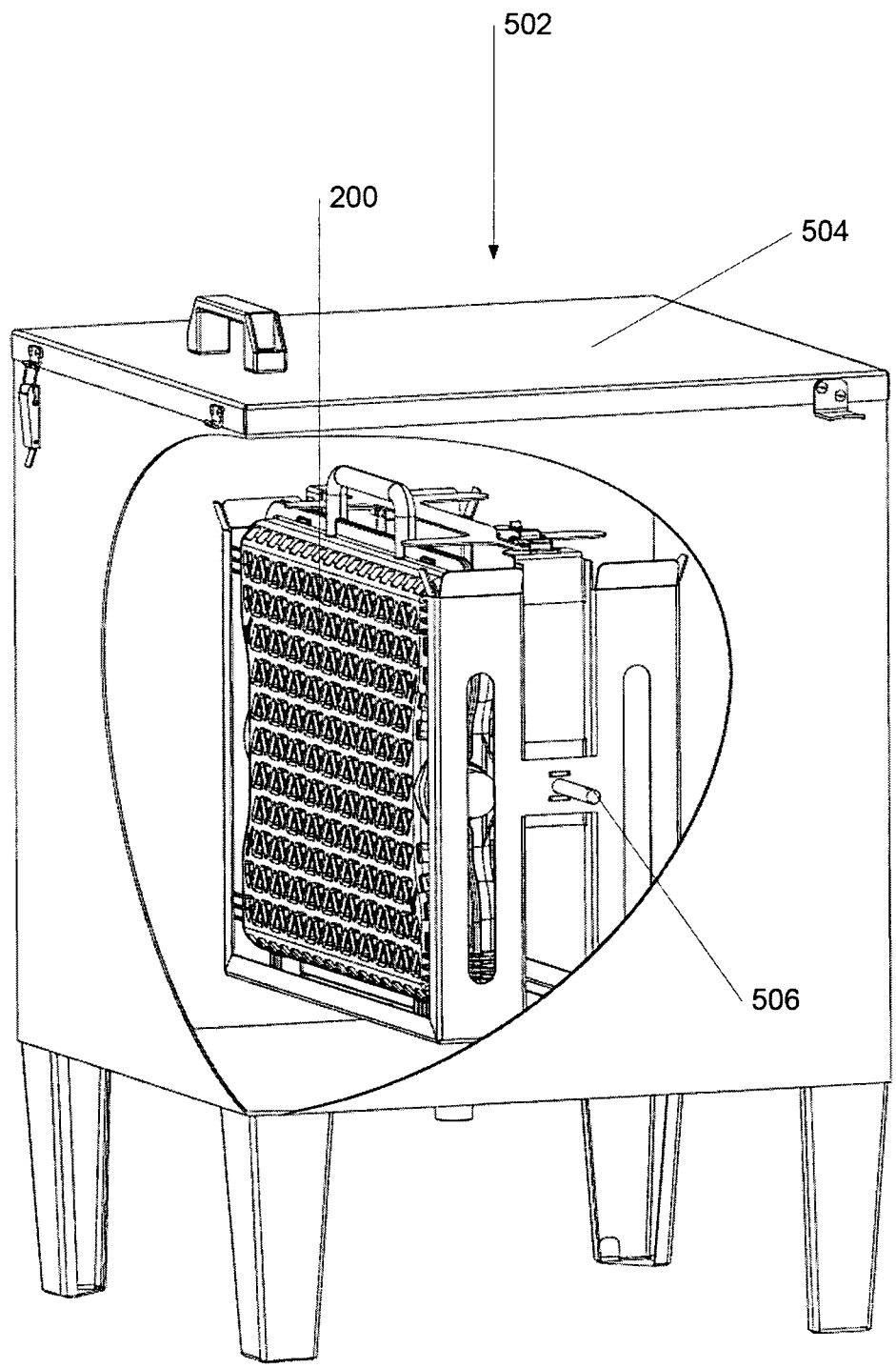

FIGS. 5a-5c illustrate the insertion of a colostrum container 102, 104, 200 inside the heating tub 502, here exemplified by the insertion of the two-part container of FIGS. 2a-c and 3a-c. In FIGS. 5a-b, the heating tub 502 is shown in an open position, whereas FIG. 5c shows the heating tub 502 after the lid 504 has been closed with a view into the container 200 placed inside the heating tub 502.

There is room for one or two containers 102, 104, 200 inside the heating tub 502. When the lid 504 is closed, a button is pressed down, which enables the activation of 1) the container(s) 102, 104, 200 placed inside a rack module 506 and 2) the heating element (not shown) inside the heating tub 502. Reversely, when the button is released, e.g. by lifting the lid 504, the rotation of the container(s) 102, 104, 200 inside the rack module 506 and the heating element is deactivated. When the lid 504 is closed, the heating tub 502 with the container(s) 102, 104, 200 inside can be activated again. The container(s) 102, 104, 200 placed in the rack module 506 will then rotate around their own center axis and the liquid (not illustrated) inside the heating tub 502 will then be in motion as the container(s) 102, 104, 200 is rotated in the heating tub 502. Hereby the surface contact between the warm liquid and the raw milk is ameliorated. This function enables the simplification and optimization of the heating process in the heating tub 502.

The object of the heating element in the heating tub 502 is to warm the liquid in order to thaw and/or pasteurize the raw milk inside the container 102, 104, 200. The liquid in the heating tub 502 may preferably be water. Normally, the heating tub contains around 100 liters of heating liquid.

The heating tub 502 has a temperature control and regulation mechanism placed inside the control unit 508 at the side of the tub 502.

It is an object of the heating tub 502 to heat the colostrum from freezing temperature (possibly refrigerator temperature) to feeding temperature (38-43 degrees Celsius).

Moreover, it is an object of the heating tub 502 to pasteurize the colostrum milk as well as heating or thawing the colostrum milk. When the heating tub 502 is used for pasteurizing the raw milk, the temperature is warmed up to 60 degrees Celsius and kept at this temperature for 1 hour. By the rotation of the containers 102, 104, 200 around their own center axis, the liquid is kept in motion, thereby ensuring a precise control of the temperature of the liquid. This is essential when e.g. pasteurizing raw milk, as not all the bacteria in the milk are killed, if the temperature drops to a few degrees below 60 degrees Celsius. Like wise, if the temperature exceeds 60 degrees Celsius by only a few degrees, damage to the essential antibodies in the raw milk may occur.

In this embodiment of the invention, the containers are turned around a horizontal axis, but constructions allowing the containers to turn around a vertical axis may also occur, if a different variety of the rack module is used.

After one or two containers 102, 104, 200 are clicked in position in the rack module 506 in the heating tub 502, the lid 504 can be closed and the heating element can be activated as well as the rotation of the containers 102, 104, 200. The lid 504 needs to be closed to activate the heating element and the rotation. The heating element and the rotation are activated by the turning and pressing of a switch (not illustrated).

The rotation of the containers 102, 104, 200 and the movement of the liquid accelerate the heat exchange from the warm liquid to the colostrum milk. There is a security stop button such that the rotation of the containers 102, 104, 200 is arrested when the lid 504 of the heating tub 502 is opened. The heating tub 502 can hereby heat the colostrum milk in a fast, gentle and careful manner.

It is important that the raw milk is not heated too intensely, given that the life giving antibodies of the raw milk will then be damaged and lose the effect on the calf.

A classical problem is to heat too intensely to reduce the heating time, and hereby the outermost raw milk is heated too much, while the innermost milk might still be frozen. This is a problem in microwave ovens and thawing tubs without movement. This effect is minimized by keeping the raw milk in constant motion.

In the bottom of the heating tub 502, there is an outlet (not shown), such that the liquid can be replaced as required and needed.

The heating tub 502 may be manufactured in stainless steel.

REFERENCE NUMBERS

102 Colostrum container I
104 Colostrum container II
105 Connector spout
106 Screw top
108 Oblique edge
110 Handle
112 Hinges
200 Colostrum container III
202 Colostrum bag
204 Perforations in the bag
205 Connector spout
206 Screw top
207 Upper end of the bag
208 Oblique edge
209 Lower end of the bag
210 Handle
212 Hinges
214 Colostrum cassette
216 First side of the colostrum cassette
218 Second side of the colostrum cassette
220 Pins
222 Third side of the colostrum cassette
224 Cavities
226 Fourth side of the colostrum cassette
228 Recesses
230 Openings and channels in the colostrum cassette
400 Filling holder
402 Funnel
404 Spigot
502 Heating tub
504 Lid
506 Rack module
508 Control unit

The invention claimed is:

1. A colostrum heating system comprising:
  a container for storing said colostrum therein, said container comprising a cassette and a flexible bag adapted to be mounted in and secured to said cassette; and
  a colostrum heating tub, where said colostrum heating tub is adapted for holding:
    a stationary pool of heating liquid, such as water, provided within said colostrum heating tub, and surrounding said container, wherein said stationary pool of heating liquid is maintained at a uniform temperature; and
    said container, such that it is at least partly immersed in said heating liquid when positioned in said colostrum heating tub;
    wherein said colostrum heating tub further comprises a rack module for holding at least said container within said stationary pool of heating liquid, wherein the rack module is adapted for rotating around an axis aligned through the center of said rack module, such that at least said container can be rotated 360 degrees around said central axis, such that said container is, at all times during 360 degree rotation around said central axis in said rack module, maintained in a fixed position with respect to said rack module and at least partly immersed in said stationary pool of heating liquid for even distribution of heat throughout said container to uniformly heat said colostrum; and
    wherein heating of said heating liquid around said container and rotating of said rack module occur simultaneously.

2. A colostrum heating system according to claim 1, wherein said rack module is adapted for holding more than one container.

3. A colostrum heating system according to claim 1, wherein said axis is aligned with the horizontal plane.

4. A colostrum heating system according to claim 1, wherein said colostrum heating tub further comprises an outlet at the bottom of said colostrum heating tub, such that said liquid can be replaced as required and needed.

5. A colostrum heating system according to claim 1, wherein said colostrum heating tub comprises a heating element for changing the temperature of said heating liquid in said colostrum heating tub.

6. A colostrum heating system according to claim 1, wherein said heating liquid is water.

7. A colostrum heating system according to claim 1, wherein said flexible bag comprises two or more perforations for fixing said flexible bag in said cassette.

8. A colostrum heating system according to claim 1, wherein said cassette has a surface with inside channels allowing said heating liquid to be in continuous contact with the surface of said flexible bag with said colostrum.

9. A colostrum heating system according to claim 1, wherein said flexible bag is adapted for filling out essentially all the space inside said cassette when filled with said colostrum and mounted in said cassette.

10. A colostrum heating tub for use in a colostrum heating system comprising said colostrum heating tub and a container for storing said colostrum therein, said container comprising a cassette and a flexible bag adapted to be mounted in and secured to said cassette, wherein said colostrum heating tub is adapted for holding:
  a stationary pool of heating liquid, such as water, provided within said colostrum heating tub, and surrounding said container, wherein said stationary pool of heating liquid is maintained at a uniform temperature; and
  said container, such that it is at least partly immersed in said heating liquid when positioned in said colostrum heating tub;
  wherein said colostrum heating tub further comprises a rack module for holding at least said container within said stationary pool of heating liquid, wherein the rack module is adapted for rotating around an axis aligned through the center of said rack module, such that said container is, at all times during 360 degree rotation around said central axis in said rack module, maintained in a fixed position with respect to said rack module and at least partly immersed in said stationary pool of heating liquid for even distribution of heat throughout said container to uniformly heat said colostrum; and
  wherein heating of said heating liquid around said container and rotating of said rack module occur simultaneously.

11. A colostrum heating tub according to claim 10, wherein said rack module is adapted for holding more than one container.

12. A colostrum heating tub according to claim 10, wherein said axis is aligned with the horizontal plane.

13. A colostrum heating tub according to claim 10, wherein said colostrum heating tub further comprises an outlet at the bottom of said heating tub, such that said liquid can be replaced as required and needed.

14. A colostrum heating tub according to claim 10, wherein said colostrum heating tub comprises a heating element for changing the temperature of said heating liquid in said heating tub.

15. A colostrum heating tub according to claim 10, wherein said heating liquid is water.

16. A colostrum heating tub according to claim 10, wherein said flexible bag is adapted for filling out essentially all the space inside said cassette when filled with said colostrum and mounted in said cassette.

17. A method of heating colostrum in the colostrum heating tub as claimed in claim 10, the method comprising the actions of:

positioning said cassette containing said flexible bag with said colostrum in said rack module positioned inside said colostrum heating tub;

at least partly covering said cassette with said heating liquid;

heating said heating liquid by use of a heating element positioned inside said colostrum heating tub, and rotating said rack module such that during rotation said heating liquid at least partly covers said cassette at all times, thereby heating said colostrum in said flexible bag.

18. A method according to claim 17, wherein said heating element heats up said heating liquid to a temperature of between 40-50 degrees Celsius, thereby enabling thawing of frozen colostrum.

19. A method according to claim 17, wherein said heating element heats up said heating liquid to a temperature of 60 degrees Celsius, thereby enabling pasteurization of colostrum.

* * * * *